United States Patent [19]

Roy et al.

[11] 4,037,779
[45] July 26, 1977

[54] HEATING SYSTEM HAVING HIGH-LOW TEMPERATURE LIMIT CONTROLLED AUXILIARY BOILER

[76] Inventors: Joseph Jean Roy, 9811 Rosaryville Road, Upper Marlboro, Md. 20870; Lorenzo Roy, 81 Hawley St., Lawrence, Mass. 01843

[21] Appl. No.: 653,780

[22] Filed: Jan. 30, 1976

[51] Int. Cl.² .............................................. F24D 3/02
[52] U.S. Cl. .................................... 237/8 R; 237/61
[58] Field of Search ................... 237/61, 8 R, 9 R, 56, 237/57; 219/341

[56] References Cited

U.S. PATENT DOCUMENTS

| 2,434,574 | 1/1948 | Marshall | 237/8 R |
| 2,434,575 | 1/1948 | Marshall | 237/8 R |
| 2,480,883 | 9/1949 | Schramm | 237/8 R |
| 2,668,216 | 2/1954 | Tidd | 237/8 R X |
| 3,249,303 | 5/1966 | Townsend | 237/8 R |

Primary Examiner—William E. Wayner
Assistant Examiner—William E. Tapolcai, Jr.
Attorney, Agent, or Firm—Gilbert L. Wells

[57] ABSTRACT

A standard hot water heating system is improved by adding a high-low temperature limit controlled auxiliary boiler. The auxiliary boiler is smaller than the main boiler and the burner for the auxiliary boiler is, of course, smaller than the burner for the main boiler and uses less fuel. In a particular embodiment, the auxiliary boiler continuously maintains the temperature in both boilers within the range of about 170°-212° F. As a result of the constantly maintained elevated water temperature in the main boiler, less time is required for the main boiler burner to heat up the system upon the demand of a room thermostat.

6 Claims, 1 Drawing Figure

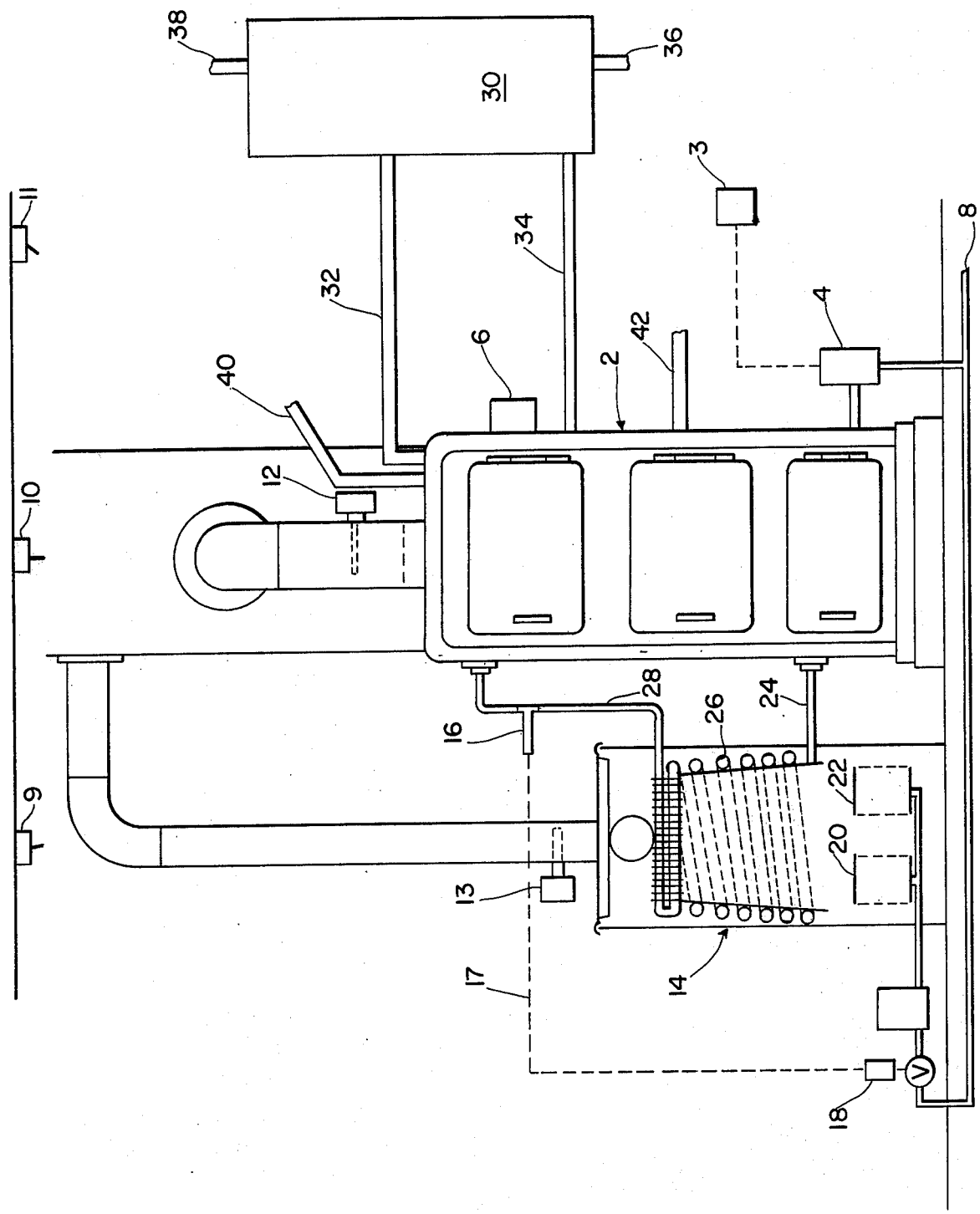

HEATING SYSTEM HAVING HIGH-LOW TEMPERATURE LIMIT CONTROLLED AUXILIARY BOILER

BACKGROUND OF THE INVENTION

The field of the invention is water heating systems having automatic control and the present invention is particularly concerned with water and - or steam-heating systems using more than one boiler to economize on fuel.

The state of the art may be ascertained by reference to U.S. Pat. Nos. 1,650,993; 1,786,900; 1,932,269; 2,046,760; 2,168,680; 2,298,847; 2,300,560; 2,480,883; 3,171,596; 3,305,172; 3,351,128 and 3,672,567, the disclosures of which are incorporated herein.

The closest prior art appears to be U.S. Pat. No. 2,480,883 of Schramm, which shows the use of a coal fired boiler and an auxiliary oil fired boiler.

Although a number of the prior art patents disclose the use of an auxiliary boiler for purposes of fuel economy, none of them have the concept of using a smaller auxiliary boiler with a more efficient burner to maintain the water temperature in the main boiler at an elevated value and to generate heat for days in spring and autumn when moderate warmth is required.

SUMMARY OF THE INVENTION

Having in mind the limitations of the prior art, it is an object of the present invention to shorten the time of burning and improve the efficiency of the main burner in a hot water heating system.

Another object of the invention is to provide a multipurpose heating system which is useful for supplying continuous hot water for household use and a two-fuel system to provide a safety in case one fuel supply fails.

The objects of the present invention are achieved by providing an auxiliary boiler which maintains the water temperature in both boilers constantly at an elevated temperature range so that the main boiler responds instantly to a demand for heat.

BRIEF DESCRIPTION OF THE DRAWING

The present invention may be best described by reference to the appended drawing wherein the FIGURE is a side view of the hot water or steam heating system.

DESCRIPTION OF THE PREFERRED EMBODIMENTS

In hot water and steam heating systems the capacity of the boiler is calculated on the basis of the lowest temperature experienced for the particular geographical location.

According to experience, however, there are only a few days during the year when the heating system is working at capacity performance and during the non-capacity performance the main burner and boiler is operating inefficiently.

According to the present invention, a small auxiliary boiler with a more efficient burner is added to the heating system for off-peak loads to keep the water temperature in the main boiler at a temperature of about 170° - 212° F. When the room thermostat, connected to the main burner controls, calls for heat then the main burner is turned on and since the water in the main boiler is already at an elevated temperature, hot water is instantaneously delivered to the radiators or convectors and the time of burning for the main burner is only that period of time needed to bring the room or space temperature to the temperature required by the thermostat. Because it is not necessary to use the less efficient main burner to bring the temperature of the water in the main boiler up to operating temperature, there is a shorter period of burning for the main burner and more efficient use of the fuel.

Since the water temperature in the heating system is constantly maintained at an elevated temperature, then it is also contemplated to use this water in heat exchange with a household water tank as a hot water source and for a heat supply during moderate temperatures.

Although the embodiments illustrated use an oil burner, the concepts of the present invention are applicable to the use of any fuel source such as natural gas, coal, other organic fuels and combinations thereof.

With particular reference to the FIGURE, the main boiler is designated 2. The main boiler is heated by main burner 4 and this burner is actuated by a thermostat 3. The water level and pressure in the main boiler are controlled by controls 6. Fuel is supplied by line 8 to the main burner and hot water is circulated to the radiators by lines 40 and 42.

Automatic damper controls 12 and 13 are located in the stacks of the respective boilers. Fire control switches 9, 10 and 11 are located on the ceiling above the heating system.

Auxiliary boiler 14 has a coil 26 connected to the main boiler by lines 24 and 28. High-low temperature limit control 16 is connected electrically to auxiliary burner valve 18 ty circuit 17.

Auxiliary burners 20 and 22 are actuated by valve 18. In a particular embodiment, the temperature limit control acutates burners 20 and 22 when the water temperature in the system goes below 170° F and turns them off when the temperature goes above 212° F.

Conventional household water heat 30 with cold water intake 36 and hot water outlet 38 is heated in heat exchange with main boiler 2 by way of water lines 32 and 34.

The system operates as follows:

The water temperature in the main boiler 2 and the auxiliary boiler 14 are maintained at an elevated temperature of about 170° – 212° F by way of high-low temperature limit control 16 which turns burners 20 and/or 22 on and off by way of valve 18.

When thermostat 3 calls for heat, main oil burner 4 is actuated and hot water is instantaneously delivered to the radiators by line 40 and cold water is returned to boiler 2 by line 42 from the radiators. During this period, the water temperature in the system is maintained by the main burner and auxiliary burners 20 and 22 are turned off by control 16.

When thermostat 3 is compensated by the heat from the radiators, burner 4 is turned off and control 16 puts burners 20 and/or 22 into operation when the temperature in the boilers again falls below 170° F.

We claim:

1. In a hot fluid conductor heating system having main boiler means with a given fluid capacity, main heating means having a given thermal capacity for heating the main boiler and thermostat means for actuating the main heating means, the improvement comprising: auxiliary boiler means having a fluid capacity less than said given capacity, said auxiliary boiler means connected to said main boiler means, auxiliary heating means having a thermal capacity substantially less than said given thermal capacity for heating the auxiliary boiler means and high-low temperature control means connected to said auxiliary heating means and maintaining a given temperature range of fluid conductor in said auxiliary and main boiler means.

2. The heating system of claim 1, wherein said main heating means is a first oil burner and said auxiliary heating means is a second oil burner.

3. The heating system of claim 1, wherein the fluid conductor is water.

4. The heating system of claim 1, wherein the fluid conductor is steam.

5. The heating system of claim 1, wherein the given temperature range is about 170° – 212° F.

6. The heating system of claim 1, further comprising of household hot water system connected in heat exchange with said main boiler means.

* * * * *